Fig. 1A

INVENTORS:
ROBERT D. COOK,
WALTER T. McHALE
ATTORNEYS.

3,533,084
**SPACE RESERVATION AND TICKET
PRINTING SYSTEM**
Robert D. Cook, Miraleste, Calif., and Walter T. McHale,
 New York, N.Y., assignors to Computicket Corporation, New York, N.Y., a corporation of Delaware
Filed Feb. 20, 1968, Ser. No. 706,970
Int. Cl. G06f 15/02, 15/26
U.S. Cl. 340—172.5                                    8 Claims

ABSTRACT OF THE DISCLOSURE

This disclosure relates to information storage and retrieval systems, and particularly to systems capable of reserving space.

An information storage and retrieval system according to the present disclosure comprises a central station linked to a plurality of remote stations. Each remote station includes control means for generating and transmitting information signals to the central computer. The central computer responds with a message indicative of the availability of the information desired, and a visual reply message are displayed at the remote station.

According to one feature of the present disclosure, a ticket printer is located at the remote station and the information signal is indicative of space desired to be reserved, while the reply signal is indicative of the availability of such space. Operation of a control means at the remote station causes the ticket printer to print tickets for the space being reserved.

SPECIFICATION

This invention relates to information storage and retrieval systems, and particularly to systems capable of reserving space and retrieving information regarding space reservation. This invention is particularly useful as a space reservation and ticket issuing system.

Heretofore, storage and retrieval of information, particularly ticket sale transaction information, has largely been done manually. For example, a purchaser desiring tickets to a particular event had to go to a ticket selling agency and state to an agent his desire to purchase tickets for a specific event. The ticket agent then telephoned a central location and verbally stated the order to an operator. The operator recorded the information on a chart and informed the ticket agent what seats were available. The agent then negotiated the ticket sale with the customer, and if the customer accepted the available seats, the agent informed the operator. The ticket agent then gave the customer a receipt which was redeemable for tickets at the box office at the time and place of the event. The entire telephone transaction between the ticket agent and the operator usually required about 5 to 10 minutes. During this time the telephone communications channels to the central location were tied up thereby preventing other ticket agents from calling the operator.

It has been the experience of many customers seeking tickets through a ticket agent to experience delays of up to 1½ to 2 hours merely because the telephone communication channels to the central location were in use by others. Furthermore, the customer would only obtain a receipt for tickets from the agent, which receipt would not be honored to gain admittance to the event. Thus, the purchaser holding the receipt had to stand in line at the box office to redeem his receipt for tickets to the event, a process which often resulted in late admittance to the event and missing part of the entertainment. If the customer desired to circumvent the ticket agency he would have to go to the box office and stand in line to obtain tickets thereby experiencing a delay.

It is an object of the present invention to provide an information and retrieval system capable of providing information regarding the availability of space in a shorter period of time than has heretofore been obtained.

Another object of the present invention is to provide an information storage and retieval system which will automatically provide information regarding the availability of space desired to be reserved.

Another object of the present invention is to provide an information and retrieval system capable of issuing tickets at a remote station for desired space for many events involving many types of space or seating both as to price and location.

Another object of the present invention is to provide remote apparatus for an information and retrieval system operable by an operator which conducts all communications with a central station of the system.

An information and retrieval system according to the present invention comprises a central station having a computer linked to a plurality of remote stations. Each remote station includes control means for generating and transmitting information signals to the central computer. The central station retrieves desired information and transmits it to the remote station. Display means is provided at the remote station for displaying a visual representation of the information signals sent to the central station and a visual representation of the reply signal from the central station.

According to an optional and desirable feature of the present invention, a ticket printer is provided at the remote station which will print and issue tickets.

Another optional and desirable feature of the present invention is the provision of a remote station for a remotely-operable information and retrieval system which can be operated with a minimum of instruction.

The above and other features of this invention will be more fully understood from the following detailed description and the accompanying drawings, in which.

Figure 1A:
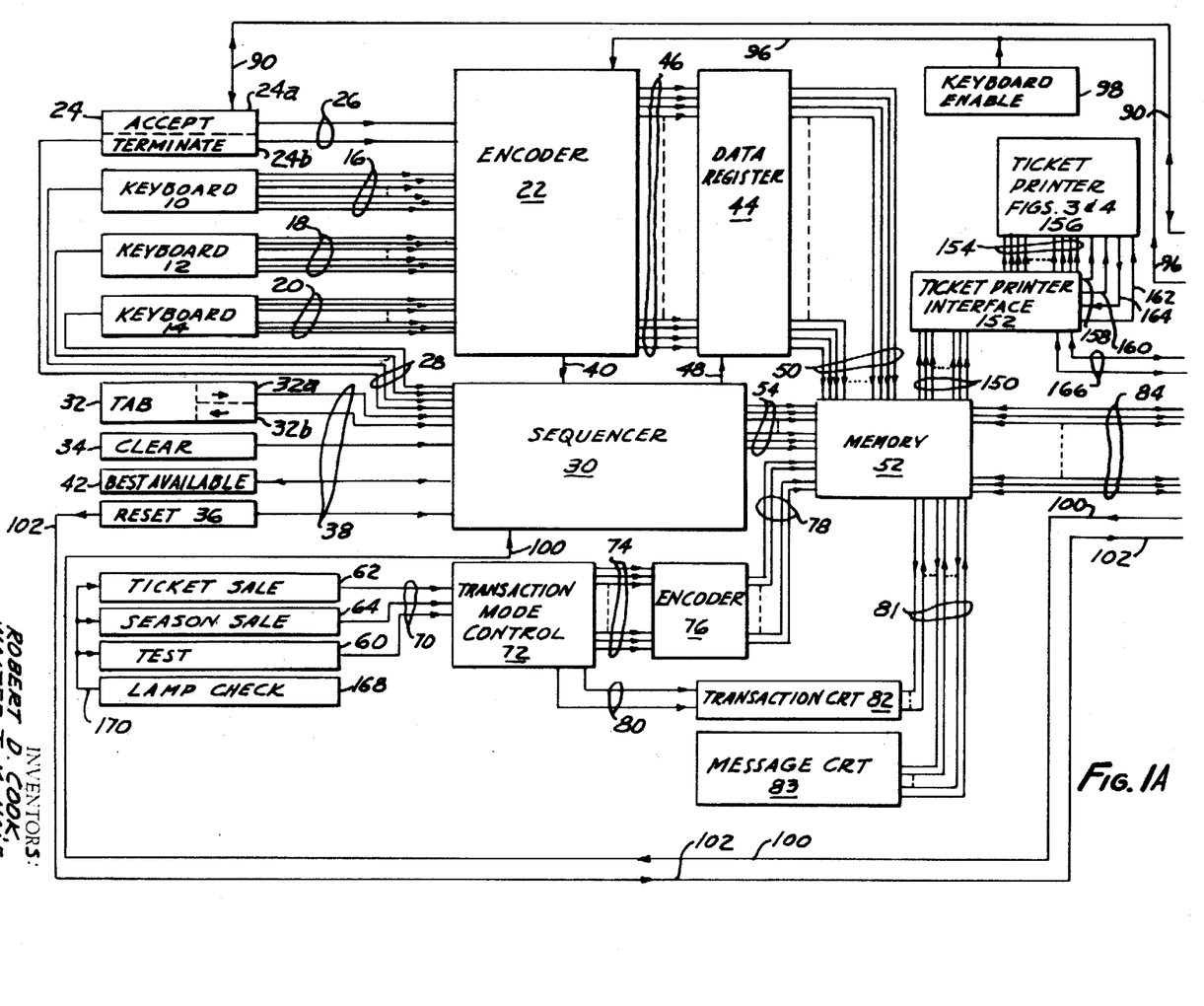
FIGS. 1A and 1B illustrate a block diagram of the presently preferred embodiment of a remote station in accordance with the present invention, the right-hand edge of FIG. 1A edge-matching with the left-hand edge of FIG. 1B.
Figure 1B:
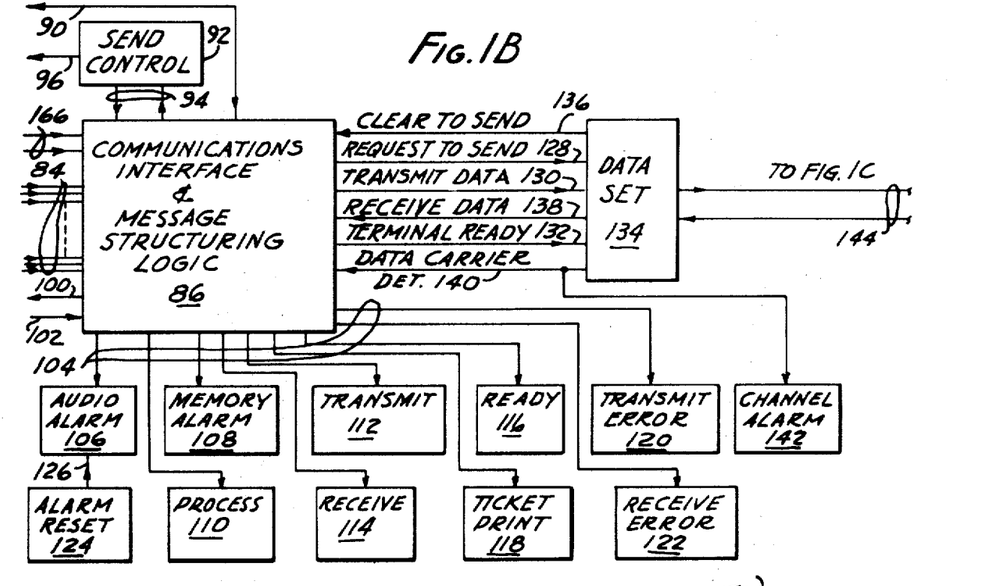
Figure 1C:
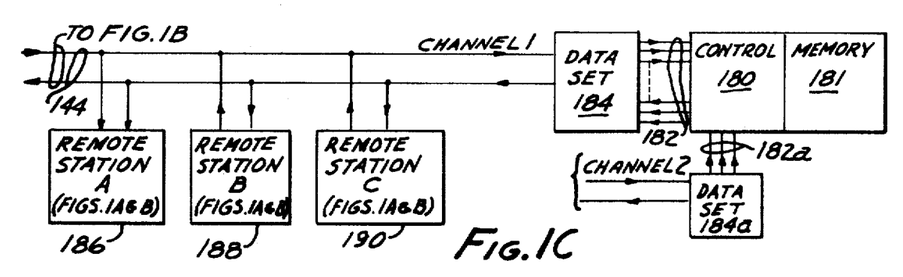
FIG. 1C is a block diagram illustrating the linkage of the remote station illustrated in FIGS. 1A and 1B with a central computer, the left-hand edge of FIG. 1C edge-matching with the right-hand edge of FIG. 1B.
Figure 2:
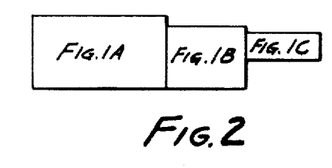
FIG. 2 is a block diagram illustrating the relationships of FIGS. 1A, 1B and 1C.

FIGS. 1A, 1B and 1C when placed together as illustrated in FIG. 2, illustrate an information and retrieval system according to the presently preferred form of the present invention, channels 84, 90, 96, 100, 102 and 166 in FIG. 1A being linked to channels bearing the same reference numerals in FIG. 1B, and channel 144 in FIG. 1B being linked to channel 144 in FIG. 1C. FIGS. 1A and 1B, taken together, illustrate a block diagram of the presently preferred embodiment of a remote station in accordance with the present invention. The remote station may be housed in a suitable console (not shown). Keyboards 10, 12 and 14 are mounted to a panel on the console and are connected via suitable communication channels 16, 18 and 20, respectively, to encoder 22. As will be more fully explained hereinafter, keyboard 10 comprises a plurality of keys (not shown), each denoting a particular event. Keyboard 12 includes a plurality of keys (not shown). Thirty-one keys on keyboard 12 denote the day of the month by number, twelve keys denote the month of the year, and four keys denote time by morning, afternoon, evening and night. Keyboard 14 comprises a plurality of keys (not shown) denoting numbers and letters. By way of example, the keys on keyboard 14 may be positioned in a format similar to that of an ordinary typewriter. Accept/terminate control 24 is connected via communication channel 26 to encoder 22. Of course other keyboard formats may be used, as desired. For example, instead of thirty-one keys to denote the day of the month, ten keys may be used so that a particular date may be selected by a combination of keys. Also, single keys may be provided for designating popular dates, such as "today" and "tomorrow."

Keyboards 10, 12 and 14 and accept/terminate control 24 are also connected via separate ones of communication channels 28 to sequencer 30.

The console panel also includes a tab control 32, a clear control 34, reset control 36 and a best available lamp 42. Tab control 32, clear control 34, reset control 36 and best available lamp 42 are connected via separate ones of communication channel 38 to sequencer 30. Encoder 22 is connected to sequencer 30 through channel 40 and is also connected to data register 44 through communication channels 46. Sequencer 30 is connected via commuication channel 48 to data register 44.

The output of data register 44 is connected via communication channels 50 to memory 52. The output of sequencer 30 is connected via communication channel 54 to memory 52.

The console panel also includes test control 60, ticket sale control 62 and season sale control 64. These controls are connected via separate ones of communication channels 70 to transaction mode control 72. As will be more fully explained hereinafter, transaction mode control 72 controls the type of transaction to be conducted by the system. By way of example, operation of season sale control 64 will cause the transaction being conducted to be for a season ticket, such as a season ticket to a sporting event.

The output of transaction mode control 72 is connected via communication channel 74 to encoder 76, which in turn is connected via communication channel 78 to memory 52. The output of transaction mode control 72 is also connected via communication channel 80 to transaction CRT 82. Memory 52 is connected to message CRT 83 and to transaction CRT 82, via communication channel 81. The output of memory 52 is also connected via communication channel 84 to communications interface and message structuring logic 86 (FIG. 1B). As will be more fully understood hereinafter, the information transmitted over communication channel 84 may be in either direction between the memory 52 and the communications interface and message structuring logic 86. Communications interface and message structuring logic 86 is also connected via communications channel 90 to accept/terminate control 24.

Send control 92 is connected via commuications channel 94 to communications interface and message structuring logic 86. As will be more fully explained hereinafter, operation of send control 92 causes a message stored in memory 52 to be sent from communications interface and message structuring logic 86 to the central controller 180 (shown in FIG. 1C) and causes a signal to be placed on channel 96 which will inhibit the encoder 22 and keyboards 10, 12 and 14 from storing additional information. Keyboard enable control 98 (FIG. 1A) is also connected to communication channel 96 so as to override the inhibit signal on channel 96 upon completion of a transaction.

Communications interface and message structuring logic 86 is connected via communications channel 100 to sequencer 30. Reset 36 is connected via communications channel 102 to communications interface and message structuring logic 86. Communications interface and message structuring logic 86 is also connected via separate ones of communication channels 104 to audio alarm 106, memory alarm 108, process lamp 110, transmit lamp 112, receive lamp 114, ready lamp 116, ticket print lamp 118, transmit error lamp 120, and receive error lamp 122. Alarm reset 124 is connected via channel 126 to audio alarm 106 so as to inhibit, or acknowledge, the audio alarm upon its operation.

The output of communications interface and message structuring logic 86 is connected via Request-To-Send channel 128, Transmit Data channel 130 and Terminal Ready channel 132 to data set 134. Data set 134 is connected to communications interface and message structuring logic 86 via Clear-To-Send channel 136, Receive Data channel 138 and Data Carrier Detection channel 140. Data Carrier Detection channel 140 is also connected to channel alarm 142. The output of data set 134 is connected to communications channel 144, which in turn is connected to a central computer (FIG. 1C).

Referring particularly to FIG. 1A, the output of memory 52 is connected via communications channel 150 to ticket printer interface 152. The output of ticket printer interface 152 is connected via communications channel 154 to ticket printer 156 (shown in greater detail in FIGS. 3 and 4). The output of ticket printer interface 152 is also connected via channels 158, 160 and 162 to control the print command, shear command and color code of ticket printer 156, respectively. Ticket printer 156 is also connected to ticket printer interface 152 through channel 164 to inhibit or enable the receipt of data by ticket printer 156 from ticket printer interface 152. Ticket printer interface 152 is also in two-way communication through communications channel 166 with communications interface and message structuring logic 86.

A lamp check control 168 is connected via channel 170 to each of the lamps associated with the test control 60, ticket sale control 62 and season sale control 64. Also, lamp check control 168 may be connected to lamps 108, 110, 112, 114, 116, 118, 120 and 122 to check their operability.

FIG. 1C is a block diagram illustrating the connection between the central computer and the remote stations. The central computer comprises memory 181 and controller 180 which is connected via communication channels 182 and 182a to data sets 184 and 184a. Each data set 184 is connected to a plurality of remote stations via one of communication channels 144, 144a, etc. which are indicated in the drawings as Channel 1, Channel 2, etc. As will be more fully explained hereinafter, each remote station on each channel has its own identifying address so that the central computer may select and identify a particular remote station with which it is to communicate by means of the identifying address. Any number of remote stations may be connected to any particular communication channel 144, the number being limited only by the capacity of the computer in its addressing network. Likewise, any number of data sets 184, 184a, etc., may be connected to controller 180, the number likewise being limited only by the capacity of the computer.

By way of example, the central computer comprising controller 180 and memory 181 may be a general purpose computer, commercially available from International Business Machines Company and known as "IBM/360 Model 40" general purpose computer. If the central computer is linked to the remote stations via telephone lines, a suitable transmission control unit (not shown), such as "IBM Model 2702 Transmission Control Unit," commercially available from International Business Machines Company, is connected to the computer. Data sets 134 and 184 may be "Model No. 202D Data Sets," commercially available from the American Telephone and Telegraph Company.

Figures 3, 4, 5:
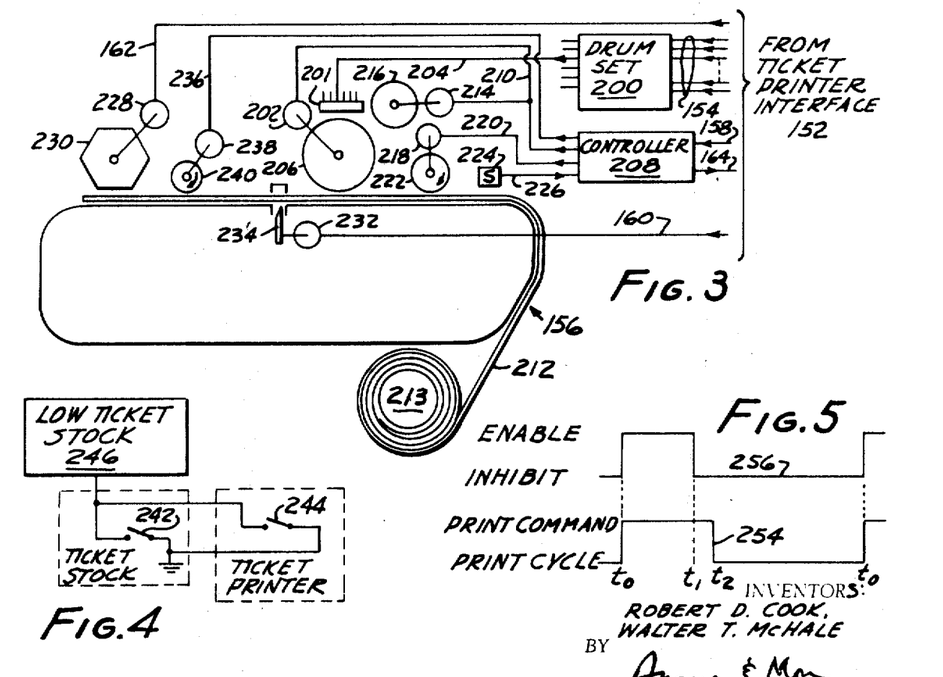
FIG. 3 is a block diagram of a ticket printer for use in the remote station illustrated in FIGS. 1A and 1B.
FIG. 4 is a schematic diagram of a warning system for use in the ticket printer illustrated in FIG. 3.
FIG. 5 is an illustration of wave forms associated with the ticket printer illustrated in FIG. 3.

Referring to FIG. 3, there is illustrated an electromechanical block diagram of ticket printer 156 for use with the remote station illustrated in FIGS. 1A and 1B. Ticket printer 156 includes a drum set 200 adapted to receive data from ticket printer interface 152 in FIG. 1A via communication channel 154. The output from drum set 200 is connected via channel 204 to character set 201 to select and set print characters on print drum 206. Controller 208 is connected via channel 158 to ticket printer interface 152 to receive a print command signal (shown as waveform 254 in FIG. 5). Controller 208 provides a signal via channel 210 to motor 202 to rotate the print drum, thereby causing print drum 206 to print the characters selected by drum set 200 onto ticket stock 212. Also, controller 208 initiates motor 214 to cause inking mechanism 216 to ink the characters on printing drum 206. Controller 208 is also connected via channel 164 to ticket printer interface 152 to send a data enable signal (shown as waveform 256 in FIG. 5).

While a printing operation is occurring, an inhibit signal (shown in FIG. 5 as waveform 256) is sent to ticket printer interface 152 via channel 164 to prevent the ticket printer interface from supplying more data via channels 154 to the drum set 200.

Ticket stock 212 may be a continuous ribbon of ticket stock wound on drum 213 and fed through the printer mechanism. Of course other forms of ticket stock and stock supplies may be used as, for example, fan-folded ticket stock carried in a cartridge. The width of ticket stock 212 is the same as the ticket to be printed and issued by ticket printer 156. At specified locations along the length of ticket stock, the ticket stock is perforated at perforations 268 (FIG. 6) across its width so that when the printed tickets 250 are discharged from the ticket printer, the tickets will have a main body portion 250a and an attached stub portion 250b separated by the perforations. Also, for purposes to be more fully explained hereinafter, ticket stock 212 includes indicia 252 located on the ticket stock at a specified distance from the perforations. The indicias provide synchronization between the ticket stock location and the print mechanism to assure proper location of the printed characters on the ticket to be printed by the ticket printer.

When the first set of characters on print drum 206 is printed on the ticket stock, controller 208 initiates motor 218 via channel 220 to cause roller 222 to advance the ticket stock an incremental distance to bring the ticket in line for the next character print cycle. The inhibit signal is removed from channel 164 to the ticket printer interface 152 and additional data is placed in drum set 200 and the characters on printer drum 206 reset for the next set of characters.

The cycle continues until the printing has been completed and the next indicia on ticket stock 212 has reached a position adjacent sensor 224. When the indicia is adjacent sensor 224, a signal is imposed on controller 208 through channel 226 which in turn informs the ticket printer interface 152 that the ticket has reached its final position. Ticket printer interface 152 responds with a suitable signal via channel 162 to controller 228 to cause color bar mechanism 230 to print a color bar on the ticket. A signal is supplied from the ticket printer interface 152 via channel 160 to motor 232 to initiate the shear mechanism 234. Shear mechanism 234 shears the ticket stock 212 and a signal is supplied via channel 236 to motor 238 to rotate roller 240 to eject the ticket printed and sheared by the ticket printing mechanism. The shear mechanism 234 and color bar mechanism 230 may be initiated in any desirable order.

FIG. 4 illustrates a simple low ticket stock detector utilizing a pair of sensors 242 and 244 associated with the ticket stock drum 213 and the ticket printing mechanism, respectively. Sensors 242 and 244 may, for example, be low level sensing switches connected to low ticket stock lamp 246. Sensor 244 may, for example, be placed in the feed channel adjacent roller 222, and sensor 242 may be placed adjacent drum 213. It is preferred that sensors 242 and 244 operate on lamp 246 independently of each other, and therefore are connected in parallel between ground and lamp 246. It is to be understood that lamp check 168 in FIG. 1A may be associated with low ticket stock lamp 246 so as to test the operability of the low ticket stock lamp.

OPERATION

In the operation of the reservation and ticket printing system according to the present invention, the central controller 180 transmits a carrier signal via communication channels 144, 144a, etc., to all remote stations. The carrier signal received by each remote station is relayed by data set 134 to communications interface and message structuring logic 86 via Data Carrier Detector channel 140. Absence of the carrier signal on channel 140 causes operation of channel alarm 142 to indicate a lack of continuity between the central computer and the remote station. This lack of continuity could be caused by a failure of the communications channel 144, or because the central computer is not operating.

When a remote station is initially turned on, communications interface and message structuring logic 86 places a carrier signal on Terminal Ready channel 132 thereby causing a carrier signal to be sent via channel 144 to the central computer. Absence of this signal on channel 144 notifies the central computer that the particular terminal is not operating. The central computer preferably includes suitable indicating apparatus (not shown) to indicate that the particular remote station is not operating. Also, subsequent messages sent by the controller in the central computer need not be addressed to any nonoperative remote stations, so the time involved in sending messages need not be wasted in addressing nonoperative terminal equipment.

The signal sent by the central computer may include a message modulated on the carrier signal, typical messages being: a polling, an interrogation message, and a display and ticket print message. The terminal or remote station is capable of sending several types of messages, typical messages being: an affirmative message, a negative message, a transaction message, a terminate message, and an accept message. Although messages transmitted between the central computer and the remote stations will, for the most part, be hereinafter described in alpha-numeric configurations, it is understood that it is preferable to utilize binary codes for transmission and storage purposes and that the alpha-numeric representations are merely shorthand notations of the binary form of the messages. It is to be further understood, however, that any code which is compatible with the computer may be used instead of the binary code, one example of a suitable message code being ternary code.

POLLING

The central computer starts the communications by transmitting a polling message over each channel. Each polling message preferably includes a control character (hereinafter denoted "C") followed by an address and a polling character. The address indicates the particular remote station being polled. For example, remote stations A, B, C, etc., may have individual addresses "A," "B," "C," etc., respectively. It is to be understood that the number of remote stations on each channel is limited only by the capacity of the central computer. The polling character (hereinafter denoted as "1") follows the address. Therefore, to poll remote Station A, the polling message will be CA1.

The polling message is received by data sets 134 at each remote station and is transmitted via Receive Data channel 138 to communications interface and message structuring logic 86. Unit 86, in response to the polling character "1," determines that the message is a polling message and compares the message address ("A" in the example) with the address stored in memory 52. If the address of the polling message is not the same as the address in memory 52 of the remote station, the remote station simply ignores the polling message and does not respond. If, however, the address of the polling message corresponds with the address of the remote station, the communications interface and message structuring logic 86 places a signal on Request To Send channel 128 to condition data set 134 to link Transmit Data channel 130 with communication channel 144. When data set 134 has successfully connected channel 130 with channel 144, the data set sends a signal via Clear To Send channel 136 to communications interface and message structuring logic 86 to permit transmission of a message to the central computer.

The particular message sent to the central computer in response to the polling message is determined by send control 92. As will be more fully understood hereinafter, the send control is initiated by the operator after a transaction message has been formulated and stored in memory 52. Thus, if the remote station is ready to send a transaction message, send control 92 will be in an initiated state. Conversely, if the remote terminal is not ready to send a transaction message, send control 92 is uninitiated. If send control 92 has been operated, logic 86 causes an affirmative signal (hereinafter denoted "Y") to be sent to the central computer via data set 134. If send control 92 has not been operated, logic 86 causes a negative signal (hereinafter denoted "N") to be sent to the central computer.

Upon receipt of either an affirmative message (Y) or a negative message (N) by central controller 180 in response to a polling message, the central controller stores the response in memory 181 and proceeds to poll the remaining remote stations, which in turn respond with either N or Y. For purposes of illustration, it will be assumed that there are three remote stations on Channnel 1 (A, B and C) and that remote Station A is ready to send a transaction message, but that remote stations B and C are not ready to send. In this case, the entire polling cycle will appears as:

CA1 (from central computer)
Y (from remote station A)
CB1 (from central computer)
N (from remote station B)
CC1 (from central computer)
N (from remote station C)

In the example, the central computer is notified that remote station A is ready to send a message while stations B and C are not. The central computer then sends an interrogation message to the remote station that responded affirmatively to the polling message.

INTERROGATION

Central controller 180 initiates' the interrogation sequence by sending an interrogation message to the remote station which responded to polling with an affirmative answer (remote station A in the example). The interrogation message, which is a command to the remote station to send a transaction message, consists of a control character (herein denoted "C") which is preferably the same character used for control during the polling sequence, an address character, and an interrogation character. The address character is the address of the remote station being interrogated, and the interrogation character (hereinafter denoted as $\phi$) follows the message. To interrogate remote station A, the interrogation message will be: CA$\phi$. The interrogation message is received via Receive Data channel 138 and logic 86 conditions data set 134 to link channel 130 to channel 144 as hereinbefore described. The remote station then sends its transaction message to the computer in response to the interrogation message.

TRANSACTION MESSAGE

In the case of a space reservation, the transaction message is determinative of the sale of a ticket, as well as the reservation of space at the event specified.

The tansaction message comprises a transaction character (hereinafter denoted "T"), followed by the text of the transaction, followed by an end-of-message character (hereinafter denoted "E"), followed by a parity character (hereinafter denoted "P"). The purpose, generation and explanation of the parity character will be discussed in greater detail below in the section titled "Parity," but it is sufficient to note that the parity character is added to the message by communications interface and message structuring logic 86 for the purpose of detecting errors in messages. A typical transaction message, responding to an interrogation message, will be: T TEXT EP.

The text of the transaction message consists of several categories, the information contained in each category being selected by the operator by operation of the keys on the keyboard consoles. Furthermore, the type of transaction is likewise selected by the operator. Table I sets forth nine information categories associated with ticket sale transactions, together with their designations and their characters. Table II sets forth nine information categories associated with season sale transactions, together with their designations and characters.

TABLE I—TICKET SALE TRANSACTIONS

| Category | Designation | Character |
|---|---|---|
| A | Site code | |
| B | Date | $a_1$ |
| C | No. of tickets | |
| D | Time code | $d_1$ |
| E | Price | $e_1$ |
| F | Section/area | $f_1$ |
| G | Row/aisle | $g_1$ |
| H | Seat | $h_1$ |
| I | Discount code | $i_1$ |

TABLE II—SEASON SALE TRANSACTIONS

| Category | Designation | Character |
|---|---|---|
| A | Site code | |
| B | First date | $a_2$ |
| C | No. of subscriptions | |
| D | Time code | $d_2$ |
| E | Price | $e_2$ |
| F | Section/area | $f_2$ |
| G | Row/aisle | $g_2$ |
| H | Seat | $h_2$ |
| I | Special instructions | $i_2$ |

The operator first selects the transaction mode by depressing the key on the console associated with either ticket sale control 62 or season sale control 64. Operation of one of the controls 62 or 64 causes a signal to be sent via communication channel 70 to transaction mode control 72. Transaction mode control 72 selects one set of characters $a_1$, $d_1$-$i_1$, or $a_2$, $d_2$-$i_2$. The selected set of characters is then sent via channel 74 to encoder 76 where the characters are translated into binary form and prepared for sending to memory 52 via channel 78 for storage in preselected locations.

After the transaction mode has been selected, the operator selects the information for each category, using keyboards 10, 12 and 14. The site code (category A) is selected by depressing a key on keyboard 10. Each key on keyboard 10 has a removable indicia (not shown) indicative of the event or site whose code is generated by that key. For example, the keys may be labeled "Dodgers," "Angels," "Rams," "Hollywood Bowl," "Music Center," etc. Depression of the key labeled "Dodgers" will cause a signal indicative of the selected site code to be transmitted via channel 16 to encoder 22 where it is translated into binary form. The selected binary site code is then sent to data register 44 via channel 46 and thereafter to memory 52 where, as will be further explained, it is stored in a preselected location.

The Date code associated with the ticket sale transaction or the first date code associated with the season sale transaction (Category B) is selected by depressing a day and month key on keyboard 12 associated with the date, thereby causing a code indicative of the selected date to be generated and stored in a preselected location in memory 52. The number of tickets or subscriptions code (Category C) is selected by depressing an appropriate key on keyboard 14 thereby storing the number of tickets code in a preselected location in the memory. As noted above, keyboard 14 includes a plurality of keys each separately labeled with a number or letter. As will be further understood hereinafter, keyboard 14 controls the format of information associated with each of categories C and E through I.

At the beginning of the formation of the text of the transaction code, the operator operates either ticket sale control 62 or season sale control 64. As noted above, operation of one of controls 62 or 64 causes one of the sets of characters associated with the selected transaction to be generated and stored in preselected places in memory 52. Also, a lamp behind the selected keyboard control is lighted, thereby providing permanent indication to the operator of the type of transaction selected.

By way of example, assuming that the transaction is a ticket sale transaction, the first category (A) of the ticket sale transaction is the site code. When the information regarding the site code (Category A) has been received by encoder 22, a signal is sent from encoder 22 to sequencer 30 via channel 40. Sequencer 30 then controls data register 44 through channel 48 to assure that the code associated with category A is placed in the memory 52 in a preselected location. In the same manner, the codes associated with categories B and C are placed in other preselected locations in the memory.

The information stored in memory 52 is sent via channel 81 to transaction CRT 82.

Figure 7:
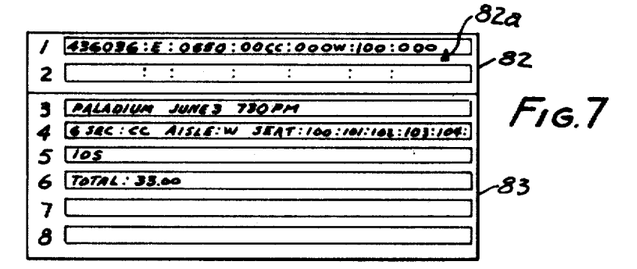
FIGS. 7, 8 and 9 are illustrations of display units in the remote station illustrated in FIGS. 1A and 1B showing visual representations of space reservation transactions.
Figure 8:
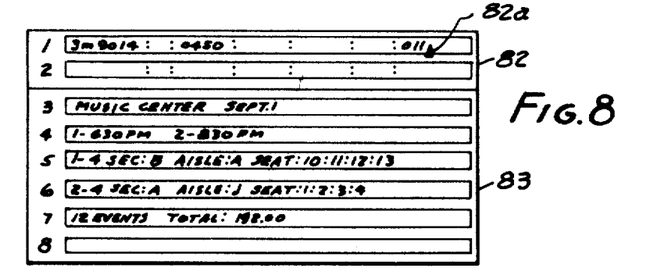
Figure 9:
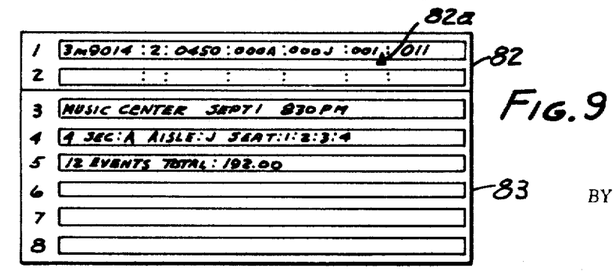

Transaction CRT 82 and Message CRT 83 are preferably alpha-numeric cathode-ray tubes capable of displaying letters and numbers. As illustrated in FIGS. 7, 8 and 9, transaction CRT 82 preferably includes two lines of display, and message CRT 83 preferably includes six lines of display.

The information contained in categories A, B and C is displayed in sequence on the first line of the transaction CRT. By way of example, the site code may consist of two characters, the date code may consist of three characters, and the number of tickets code may consist of one character.

For purposes of example, assume that a transaction is being conducted for a ticket sale for 6 tickets (category C) to the Paladium (category A) for the evening (category D) of June 3 (category B), that the purchaser is desirous of obtaining seats 100-105, inclusive (category H), in aisle W (category G), section CC (category F) at a price of $5.50 per ticket (category E), and that the tickets desired are not available at a discount (category I). Assume further that the site code for the Paladium is "43." (Although this example may seem unduly specific because a purchaser generally does not know exactly what seats are available, it will be further explained hereinafter that the central computer is capable of assisting the transaction and that certain categories may be omitted from initial consideration.)

The operator first depresses the key associated with ticket sale transaction control 62 thereby causing the lamp behind the ticket sale key to turn on and causing selection of the ticket sale code $a_1$, $d_1$, $e_1$, $f_1$, $g_1$, $h_1$ and $i_1$ to be stored in preselected locations in memory 52. The operator then depresses the key on keyboard 10 labeled "Paladium" causing the binary form of the site code "43" to be placed in memory 52 at a preselected location. The selected site code is sent from the memory to transaction CRT 82 where it is displayed. See FIG. 7.

The operator then depresses month key 6 and date key 03 on keyboard 12 thereby causing the date code "603" to be stored in memory and displayed on transaction CRT 82. The key labeled 6 on keyboard 14 is then depressed to store "6" in memory 52, as the number of tickets desired. This number is also displayed on transaction CRT 82.

The information regarding categories A, B and C is stored in sequence in memory, together with control characters indicative of the ticket sale transaction. The code thus far stored in memory is: $a_1 436036$. (It is to be understood, however, that the code stored in memory 52 is in binary form rather than the alpha-numeric form represented on the transaction CRT.)

When the information for categories A, B and C has been stored in memory, memory 52 determines that the next character of the message is a control character $(d_1)$. It is preferred that the transaction CRT move forward one space or display a slash mark or other indicia indicative to the operator that the next character which will be displayed is the character for the next category. For purposes of example, a colon ( : ) will be illustrated as displayed at the location of each control character.

In the example, it has been specified that the purchaser desires tickets for an evening show. The operator depresses a key on keyboard 12 indicative of the time of the event. Preferably, there are at least four time code keys on keyboard 12 indicative of morning, afternoon, evening and night. Depression of the evening key causes the character "E" to be stored in memory 52 at a preselected location, and the character "E" is displayed on transaction CRT 82. It is to be understood, however, that the alpha-numeric form of the time code may be a numeral rather than an alphabetical letter.

The price code is then added to memory 52 and transaction CRT 82 by depressing appropriate keys on keyboard 14. The price code preferably contains four characters and the alpha-numeric version of the price code preferably is indicative of the price of the tickets. In the example, the operator depresses the keys labeled 0, 5, 5, and 0 in sequence to obtain an alpha-numeric price code of 0550, indicative of a ticket price of $5.50.

The Section/Area code is then inserted into memory 52 by depressing appropriate keys on keyboard 14. There are preferably four characters to the Section/Area code. The code for Section CC in the example will be assumed to be "00CC."

The Row/Aisle code is then inserted into a preselected location in memory 52 by depressing appropriate keys on keyboard 14. The Row/Aisle code preferably includes four alpha-numeric characters, so that in the example the Row/Aisle code stored in memory 52 and displayed on Transaction CRT 82 is "000W" (indicative of Row W).

The seat code for the first seat of the sequence is inserted into a preselected location in memory 52 and is displayed on Transaction CRT 82 by depressing appropriate keys on keyboard 14. In the example, the first seat of the six desired is seat 100, so the seat code is "100."

The discount code is added after the seat code, but since the example has no discount provision, the discount code is "000."

The transaction code for the example, as finally stored in memory 52, is the binary form of the alpha-numeric code: $a_1 436036 d_1 E e_1 0550 f_1 00CC g_1 000W h_1 100 i_1 000$.

If the operator is satisfied with the code displayed on transaction CRT 82, which is indicative of the transaction code in memory 52, he depresses the key associated with send control 92, thereby lighting the lamp (not shown) behind the send control key and also sending a signal via channel 94 to communications interface and message structuring logic 86. Operation of send control 92 causes an inhibit signal to be sent via channel 96 to encoder 22 to prevent any further information from being added to memory 52 via keyboards 10, 12 and 14. Operation of send control 92 also conditions communications interface and message structuring logic 86 to answer the next polling message from central controller 180 with an affirmative signal as hereinbefore explained. The affirmative signal will be sent through data set 134 via channel 130. The central controller then interrogates the remote station via channel 138 as heretofore discussed in the section titled "Interrogation." In response to the interrogation signal from the central computer, the remote station sends its transaction message via channel 130.

The communications interface and message structuring logic 86 transmits a transaction control character "T," followed by the transaction text as set forth above, followed by an end-of-message control character E. Unit 86 also scans the entire message being transmitted and adds a parity character "P" at the end of the message.

In the example set forth above, it has been assumed that the transaction is being conducted by remote station A on Channel 1, that there are three stations (A, B and C) on channel 1, that the transaction message has been stored in memory 52 of the remote station A, and that the send control 92 in remote station A has conditioned remote station A for an affirmative response to a polling message. The entire sequence of polling, interrogation, and transaction message appears as follows:

CA1 (poll from central computer)
$\overline{Y}$ (answer from remote station A)
CB1 (poll from central computer)
$\overline{N}$ (answer from remote station B)
CC1 (poll from central computer)
$\overline{N}$ (answer from remote station C)
CAØ (interrogation from central computer)

$Ta_1436036b_1Ee_10550f_100CCg_1000Wh_1100i_1000\underline{E}P$ (transaction message from remote station A).

PARITY

To determine the form of the parity character P, the communications interface and message structuring logic 86 scans the entire transaction message and determines whether the binary form of the message is odd or even. The message characters are each constructed of a plurality of binary bits of 1's or 0's. The message is considered odd if there are an odd number of 1's in the binary message, while the message is considered even if it contains an even number of 1's. The parity character is preferably a single binary bit and is either 1 or 0. The parity character or bit is chosen so that the entire message contains an odd number of 1's. Thus, if the remainder of the message (T TEXT E) has an odd number of 1's, the parity character is 0, while if the remainder of the message is even, the parity character is 1. In either case, the entire message, including parity, will contain an odd number of 1's.

TRANSACTION ERROR

If the central computer receives a purported transaction message in response to an interrogation containing an even number of 1's, the parity check apparatus (not shown) in the central computer causes an error signal to be transmitted to the remote station. The error signal contains a message alert control character (hereinafter denoted "B") and an address. Thus, if the remote station A causes an erroneous signal to be sent to the central computer, the central computer will respond with error signal "BA." Receipt of this signal by remote station A causes transmit error lamp 120 to be lighted and audio alarm 106 to operate. The operator may thereafter reset or acknowledge alarm 106 by depressing alarm reset key 124 to turn off audio alarm 106 and turn on a lamp behind the alarm reset key.

The operator may then recheck the information displayed on transaction CRT 82 and, if satisfied as to the correctness of the message may reinstitute the send control to cause the transaction message to be sent again to central computer 180. If the operator is not satisfied with the message, he may operate clear control 34 to clear memory 52 of all data and to clear transaction CRT 82. He may then reformulate the message.

The error signal sent by the central computer may be sent in response to any signal containing an incorrect number of 1's. Thus, if an incorrect affirmative or negative signal is transmitted by a remote station in response to a polling message, the transmit error lamp 120 and audio alarm 106 will be operated, thereby indicating to the operator that the remote station apparatus has malfunctioned.

SPACE RESERVATION AND CONFIRMATION

If the transaction message is received without error by the central computer, the central controller 180 scans its memory 181 to determine if tickets can be sold for the space desired. If it determines that tickets have not heretofore been issued for the seats desired at the particular event, the central controller causes a coded message to be sent to the remote terminal indicative of the space being reserved and, at the same time conditions the memory in the central computer so that subsequent scanning of that memory will indicate that these spaces are reserved. The coded signal, if received by the remote station without error, conditions memory 52 at the remote terminal to cause an alpha-numeric display of the space being reserved. The message is displayed by message CRT 83.

As shown in FIG. 7, the confirmation code sent by the central computer may involve several lines of characters, in which case the code includes suitable carriage characters to indicate to memory 52 and message CRT 83 that the succeeding characters should be displayed on the next line. The confirmation code also includes the total cost of the tickets as calculated by the central computer.

Receipt of a confirmation message by communications interface and message structuring logic 86 conditions Accept/Terminate control 24 so that operation of control 24 will cause the confirmation message stored in memory 52 to be sent to ticket printer interface 152 via channel 150 to condition the ticket printer to print tickets. The receipt of the confirmation message by communications interface and message structuring logic 86 also causes appropriate signals to be sent via channel 166 to ticket printer interface 152 to prepare interface 152 to accept the stored message from memory 52.

The ticket printer 156 prints the required number of tickets 250 (FIG. 6) containing the appropriate information. The operation of the ticket printer is discussed in greater detail below.

TRANSACTION—COMPUTER ASSISTED

Heretofore, it has been assumed that the purchaser knows exactly what seats he wants for a particular event at a particular time. Although the system according to this invention is capable of handling such a transaction, it is extremely unlikely that a purchaser will know exactly what seats he wants. For this reason, the space reservation and ticket sale system is capable of supplying information to the purchaser to enable him to select what seats he wants. This feature utilizes the memory of the central computer in assisting the transaction.

In operating of the computer assisted transaction, the central computer sends its polling message via channel 144 as hereinbefore described and the remote stations each reply to their polling message with either an affirmative or negative reply, as hereinbefore described. If an affirmative reply is sent by a particular remote station, the central computer interrogates the remote station with an interrogation signal as hereinbefore described. Instead of sending a complete transaction message, the remote station sends only a partial message containing only certain information regarding the ticket sale.

As set forth above, the ticket sale and season sale transaction contain certain categories of information. The information for each category is supplied to the remote station by means of keyboards 10, 12 and 14. Certain of these categories relate to information which is basic to every sale, and the computer-assisted transaction rely on the supplying of information for these basic categories.

The operator, formulating a computer-assisted transaction message, supplies the basic information to the remote station via keyboards 10, 12 and 14. For purposes of example, it will be assumed that categories A, B and C (Site code, Date and Number of Tickets) are basic categories, so that the operator must supply information for these categories before operating the send control. Information for any of the other categories may, at the option of the purchaser, be supplied also.

For purposes of example, it will be assumed that the purchaser desires 4 season subscriptions for the Music Center beginning September 1 and that he wants tickets offered at a price of $4.50 per ticket. The purchaser does not, however, know what time the events are conducted. The purchaser is desirous of obtaining information as to the best available section, aisle and seat. It will be assumed that the purchaser is entitled to a discount of $0.50 per ticket for one reason or another. It should be noted from a comparison of Table II that this information will complete categories A, B, C, E and I, but that no information is being supplied for categories D, F, G or H.

Using keyboards 10, 12 and 14 in the manner hereinbefore described, the operator selects season sale control 64 and inserts the information regarding each category into memory 52. The operator first supplies the site code (assumed to be "3m"), category A, into memory 52 followed by the first date code ("901" for September 1), category B, followed by the number of subscriptions ("4"), category C. Since the operator has preoperated season sale control 64, the memory 52 contains the binary form of: $a_23m9014$.

The next category to be inserted would ordinarily be category D, but it has been assumed that the computer will supply this information. Therefore, the operator operates forward tab control 32a so that information category D is skipped. This operation causes a code indicative of a blank to be inserted into memory 52 at the location where category D would be inserted. At the same time, cursor 82a on transaction CRT 82 moves forward to the next category.

Operation of tab control 32 causes sequencer 30 to move its control position of memory 52 to the next category forward or backward, depending on which tab control is operated. At the same time, sequencer 30 causes a signal to be sent via channel 38 to best available lamp 42, thereby lighting the lamp to indicate that whatever message sent from the central computer will represent the best available space.

The operator then by manipulating the keyboard and tab controls, finishes the transaction message. Assuming the discount code to be "011" to represent a 50¢ discount, the alpha-numeric code is displayed in its final form on the transaction CRT 82 (see line 1 of FIG. 8) and code appears in memory 52 as: $a_23m9014e_20450i_2011$. Initiation of the send control 92 causes the entire message together with the transaction character, the end-of-message character and parity character to be sent to the central computer in response to the interrogation signal.

The central computer after receiving the transaction message determines that information for certain categories has not been supplied. In the example, neither time nor seat information has been supplied. The computer then scans its memory to determine the best seats available at each time available at the event specified on the date or dates specified and at the price specified in the transaction message. The central computer sends a message to the remote station confirming all categories sent to the central computer and containing information regarding the categories to which no information had been supplied by the operator.

The message is displayed on message CRT 83. In the example and referring to FIG. 8, line 3 displays information confirming season sales to the Music Center beginning September 1. On line 4 is displayed alternative time, 6:30 p.m. having time code 1 and 8:30 p.m. having time code 2. On line 5 is displayed information regarding the best available seats for time code 1 (6:30 p.m.) and on line 6 is displayed information regarding the best available seats for time code 2. On line 7 appears the information that the season transaction is for 12 events and that the total price for four subscriptions at $4.50 for each ticket at each event, less the $0.50 discount, is $192.00.

The purchaser then decides what seats he desires to purchase. Assuming he desires the four seats 1, 2, 3 and 4 in aisle J, section A at 8:30 p.m., the operator operates keyboard enable control 98 to remove the inhibit signal on channel 96 and then manipulates keyboards 10, 12 and 14, and tab control 32 to add the additional information into memory 52. By way of example, assuming that the transaction CRT cursor 82a is still at category I, the operator may operate tab control 32b to back up to category D and add the information for that category (time code "2"). Since category E already contains the desired information, the operator then operates tab control 32a to skip category E, and thereafter supplies information for categories F, G and H.

Upon completion of the message formulation, the complete transaction message is displayed on Transaction CRT 82 (see FIG. 9) and the operator again initiates the send control to cause the message to be sent to the central computer in response to the next interrogation signal. The computer then replies with a confirmatory message as explained in greater detail above in the section titled, "Space Reservation and Confirmation."

Channels 40 and 48, interconnecting sequencer 30 with encoder 22 and data register 44, respectively, assure the proper placement of the information signals for each category in memory 52.

CLEAR CONTROL

If for any reason the operator at the remote terminal desires to clear the memory 52 and transaction CRT 82, the operator may initiate clear control 34. Operation of clear control 34 causes sequencer 30 to erase from memory 52 any transaction message stored therein, thereby resetting the entire remote station. After the clear control is initiated and the terminal is returned to its ready condition, ready lamp 116 is initiated to indicate to the operator that the remote terminal is again ready for constructing a message. Clear control 34 is inhibited by send control 92 when the remote station is sending a message to the central station.

RESET CONTROL

Reset control 36 is similar to clear control 34 except that it is linked by communication channel 102 to communications interface and message structuring logic 86. Unlike clear control 34, reset control 36 is not inhibited by operation of send control 92 and may be initiated at any time and even after initiation of the send control. Operation of reset control 36 will reset the entire remote terminal to a ready condition and initiate ready lamp 116. Thus, all messages stored in memory 52 whether initiated by the remote terminal or stored from signals sent by the central computer, are erased from memory 52. Likewise, all messages on transaction CRT 82 and message CRT 83 are erased.

TERMINATE CONTROL

Terminate control 24b may be initiated after a confirmation signal is received from central computer 180 via a communication channel. Initiation of terminate control 24b causes a signal to be sent from the remote station to the central station to indicate to the central station computer that the particular transaction is not desired and is therefore terminated. Signals sent to the central computer by operation of terminate control 24b cause controller 180 in the central station to operate on memory 181 to erase from memory the particular transaction, thereby freeing the space for a subsequent transaction.

ACCEPT CONTROL

Accept control 24a may be initiated upon receipt and display of a proper confirmatory signal from the central computer. If the purchaser desires to purchase the tickets indicated as available on message CRT 83, the operator may initiate accept control 24a to cause the information received from the central station regarding the ticket sale transaction to be sent from memory 52 to ticket printer interface 152. Also, a signal is sent to communications interface and message structuring logic 86 to cause ticket print light 118 to be lighted and to cause appropriate timing signals to be sent via communications channel 166 to ticket printer interface 152. The operation of accept control 24a initiates the operation of the ticket printer illustrated in FIG. 3.

TICKET PRINTER

Ticket printer 156 is illustrated in greater detail in FIG. 3 and receives transaction signals via channel 154 from ticket printer interface 152. Likewise, control signals are sent to the ticket printer via channels 158, 160, 162 and 164 from the ticket printer interface. At the beginning of the ticket print cycle, a print command signal (shown as waveform 254 in FIG. 5) is sent to controller 208 from ticket printer interface 152 via channel 158. Controller 208 operates on channel 210 to cause controller 214 to move inking mechanism 216 into position to ink print drum 206. At the same time controller 208 sends an enable signal (shown as waveform 256 in FIG. 5) to ticket printer interface 152 via channel 164 to permit the first character for each of lines 260–267 for ticket 250 (see FIG. 6) to be transferred from memory 52 to drum set 200. Controller 208 also operates on controller 218 via channel 220 to rotate roller 222 to move the ticket stock 212 into position so that indicia 252 (see FIG. 6) on the ticket stock is opposite sensor 224. When in position, sensor 224 sends a signal via channel 226 to controller 208 to halt further operation of roller 222.

During the time between $t_0$ and $t_1$ (FIG. 5), the character signals are transferred from drum set 200 to character set 201 to set the first character for each line 260–267 on print drum 206. At time $t_1$, after sufficient time has been allowed to permit the setting of character set 201, an inhibit signal is sent via channel 164 to ticket printer interface 152 to prevent further information from being sent from ticket printer interface 152 to drum set 200. A short time later, at time $t_2$, the print cycle signal 254 is sent to controller 208 and controller 208 operates on controller 202 to operate print drum 206 to imprint the characters set by character set 201 on the ticket stock 212. After the first set of characters has been imprinted on ticket stock 212, controller 208 operates via channel 220 to cause controller 218 to rotate roller 222 to move the ticket stock forward ((to the left as shown in the drawings) an increment distance to permit imprinting of the next set of characters. At subsequent time $t_0$, an enable signal is sent via channel 164 to ticket printer interface 152 to permit additional characters to be set in drum set 200 and transferred to character set 201 as hereinbefore described. At time $t_1$, the second set of characters will be set on character set 201 and at time $t_2$, the second set of characters will be imprinted on ticket stock 212.

Figure 6:
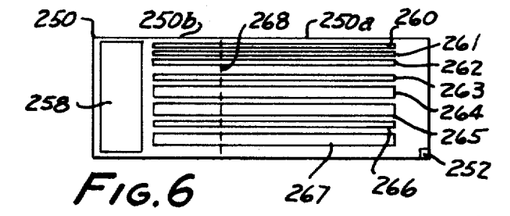
FIG. 6 is an illustration of a ticket issued by the ticket printer illustrated in FIG. 3.

The ticket printer continues to cycle, causing characters to be imprinted on ticket stock 212 until lines 260–267 on ticket 250 are completely imprinted. Each cycle of the ticket printer causes one character to be imprinted on each of the lines 260–267 of the ticket. For example, if 16 characters are to be imprinted on the ticket on any one line, the ticket printer must complete 16 full cycles.

Upon completion of the printing of the characters upon ticket stock 212, controller 208 operates on roller 222 to move the ticket stock forward until the next indicia 252 is aligned with sensor 224. Sensor 224 then sends a signal to controller 208 via channel 26 to half the operation of the roller 222. Controller 208 then sends a signal via channel 164 to ticket printer interface 152 which causes a signal to be sent via channel 162 to controller 228. Controller 228 causes color bar 230 to be rotated to the proper color as determined by the code sent by the central station and stored in memory 52 which in turn is delivered to ticket printer 156 via ticket printer interface 152. The color bar 230 imprints a color upon the head of the ticket illustrated as portion 258 of the ticket (see FIG. 6) and a signal is sent via channel 160 to controller 232 to operate knife 234. Knife 234 cuts the ticket from the ticket stock and controller 208 sends a signal via channel 236 to controller 238 to operate roller 240 to move the ticket cut from the ticket stock to the left (as shown in the drawings) to be discharged from the ticket printer.

At various times during the ticket printing operation, controller 208 causes a signal to be sent via channel 210 to controller 214 to operate inking mechanism 216. It is preferred that the inking mechanism be operated each time the drum set is operated, and for this reason it is preferred that the inking mechanism and the drum controller be connected to the same communication channel.

Color bar 230 may be provided with several different colors to designate particular types of events or other color coding insignias which are recognizable on sight when the ticket is presented for admittance to the event.

The ticket printer interface causes ticket printer 156 to issue the desired number of tickets as specified in the transaction message. By way of example, where six tickets are desired for a single event, the ticket printer interface causes ticket printer 156 to issue six tickets in accordance with the transaction. In the case of a season sale, it may be more advantageous to issue a single season pass for each seat rather than a ticket for each event during the season. Thus, in the example where four season passes were negotiated for, the ticket printer will issue four season tickets, each good for the twelve events, rather than issue 48 separate tickets.

The time involved for printing and issuing each ticket is preferably between 10 and 15 seconds. The time involved for completing a transaction by the computer is less than 5 seconds. Thus, with the exception of delay due to human determination, an entire ticket sale transaction can occur within 20 seconds. As shown in FIG. 6, the issued ticket may have several lines of printed matter. Perforations 268 are preformed in ticket stock 212 at spaced relations from indicia 252. Ticket 250 may be torn off at perforations 268 to form a ticket body portion 250a and a ticket stub portion 250b. The printing on the ticket may, if desired, be placed on both the ticket stub and the ticket body. It is preferred that the color code be imprinted on the stub portion 250b.

LAMPS AND WARNING SYSTEM

Ready lamp 116 is lit after a ticket printing cycle has been completed, or when a confirmatory message is received from the central station without error, or when either clear control 34 or reset control 36 has been operated. Ready lamp 116 indicates to the operator that the terminal is ready to initiate a transaction.

Memory lamp 108 is connected to communications interface and message structuring logic 86 to warn the operator that an error occurs within memory 52. The memory lamp is initiated by a parity check on the text of the message stored in memory 52. If the parity fails to check, as hereinbefore described, memory lamp 108 is initiated.

Process lamp 110 is lit each time that the central station confirms that the space desired is available. The process lamp is extinguished by accepting the space or by initiating either the clear or reset controls.

Receive lamp 114 is operated every time the remote station receives a message without error from the central station.

Transmit lamp 112 is operated each time that send control 92 is initiated, and indicates that a message is being sent to the central station. Lamp 112 is released upon reply from the central computer or by initiation of the clear or reset controls.

Ticket print lamp 118 is operated each time the accept control 24a has been initiated. Lamp 118 remains lit during the time that the ticket printer is printing and issuing tickets and is extinguished upon completion of the ticket printing operation or by operation of reset control 36.

Transmit error lamp 120 is operated by a signal from the central computer to indicate that the central computer has received a message containing erroneous information from the remote station.

Receive error lamp 122 is operated whenever the message sent from the central computer to the remote station contains erroneous information. For example, if the parity of the message sent from the central computer does not check, the message is considered to be erroneous and the receive error lamp is operated.

Channel alarm 142 is operated whenever the carrier signal on channel 140 is missing, as for example due to an inoperative central computer.

Lamps may also be placed behind each of the control buttons to indicate initiations of that control.

As shown in FIG. 4, operation of warning lamp 246 will indicate that the supply of ticket stock 12 is low or exhausted from the ticket printer. Lamp 246 is operated by sensor 242 adjacent supply 213 in FIG. 3 or by sensor 244 adjacent roller 222 in FIG. 3.

LAMP CHECK

Initiation of lamp check control 168 causes a signal to be sent via channel 170 to every lamp in the remote terminal to operate the lamps. Lamp check control 168 thus serves as a test for operability of all lamps.

TEST

Test control 60 is connected via channel 70 to transaction mode control 72. Operation of test control 60 causes transaction mode control 72 to store characters into memory 52 which characters are similar to ticket sale or season sale characters except that they are indicative of a test procedure. The operator may then place into memory 52 certain test characters to determine the operability of the controls associated with the remote terminal, as well as the storage and display units of the remote terminal. Suitable test codes may be sent to the central station by initiation of the send control, and the remote station may be programed to answer with other test codes. Furthermore, test tickets may be printed to test the operability of the system.

When the system is being tested, the central station operates in response to the test code to prevent any alteration of the information stored in memory 181. Thus, the entire system may be tested without affecting any space reservation signals stored in memory 181.

SUMMARY

The present invention thus provides an information and retrieval system which is useful for storing information and retrieving that information from the central computer. The system is capable of operating from any of a plurality of remote stations and is particularly useful for space reservation.

Although the present invention has been described with particular utility in space reservation and ticket sale transactions, it should be recognized that this type of system is capable of a wide number of uses. For example, the system may be used for storing and retrieving technical information in a central computer. Furthermore, the system may be used for other types of space reservation than those hereinbefore described. For example, the system may be used for obtaining and issuing air line tickets, hotel reservations and a wide variety of other applications.

The present invention permits retrieval of all information regarding space which has been sold for particular events. Thus, a promoter of a particular event may instruct the central computer to print out from its memory all sales which have occurred for that event, thus enabling the promoter to receive an accurate accounting of ticket sales before the event.

The present invention thus provides an information and retrieval system which is simple to use and highly effective. The remote stations may be placed on a desk or countertop in convenient locations, for example, in supermarkets, banks, and the like, and may be linked to the central station by ordinary telephone lines. The remote station is easily operable by an operator. A bank teller or supermarket clerk may be easily trained in the operation of a remote station to facilitate ticket sales.

This invention is not to be limited by the embodiment shown in the drawings and described in the description, which is given by way of example and not of limitation, but only in accordance with the scope of the appended claims.

What is claimed:

1. A remote station for a space reservation and ticket printing system having a plurality of such remote stations coupled to an electronic digital computer means, said remote stations being adapted to send a message signal to said computer means, which message signal contains criteria information at least partially defining desired spaces at an event, said computer means being programmed to respond to said message signals to select and identify the best available unreserved spaces satisfying the criteria contained in the information in the message signal and to reserve the selected spaces to prevent any of such spaces from being selected in response to a subsequent message signal, said computer being further programmed to form a reply signal containing information identifying each reserved selected space and containing an address indicative of the remote station from which the message signal was received by the computer means, said remote station comprising: first control means for forming said message signal; first storage means connected to said first control means for storing said message signal; first display means connected to said first storage means for displaying an alpha-numeric representation of said message signal; transmitting means connected to said first storage means for transmitting said message signal to said computer means; second control means connected to said transmitting means for initiating operation of said transmitting means to cause said message signal to be transmitted to said computer means; receiver means responsive to the address of the respective remote station for receiving reply signals from said computer means; second storage means connected to said receiver means for storing the received reply signal; second display means connected to said second storage means for displaying an alpha-numeric representation of the received reply signal; printer means for printing a permanent representation of each reserved spaced identified in the received reply signal; and third control means connected to said printer means for initiating operation of said printer means.

2. Apparatus according to claim 1 wherein the criteria information contained in said message signal pertains to one or more of the categories selected from the group consisting of identity of the event, number of spaces desired for the event, price of space and identity of space, and said reply signal contains information pertaining to all of said categories.

3. Apparatus according to claim 2 wherein the message signal includes a category character for each of the categories in said message signal, said computer means being programmed to respond to said category characters to select the best available spaces satisfying the criteria set forth in the information in the categories in said message signal.

4. Apparatus according to claim 1 further including fourth control means operatively associated with said first storage means for selecting one of a plurality of modes, said fourth control means being operable to generate mode characters indicative of the mode selected, and means for storing said mode characters in selected locations in said first storage means so that said message signal includes said mode characters.

5. Apparatus according to claim 4 wherein the criteria information contained in said message signal pertains to one or more of the categories selected from the group consisting of identity of the event, number of spaces desired for the event, price of space and identity of space, and the message signal includes a category character for each of the categories in said message signal, said computer means being programmed to respond to said category characters to select the best available spaces satisfying the criteria set forth in the information in the categories in said message signal and the reply signal contains information pertaining to all of said categories.

6. Apparatus according to claim 1 wherein said printer means includes holder means for holding print stock, print means including a plurality of character printers, fifth control means responsive to the reply signal in said second storage means for positioning selected ones of said character printers in accordance with the information contained in said reply message, means for applying said print means to said print stock to cause the selected character printers to print characters on said stock, and shear means for shearing the printed stock.

7. Apparatus according to claim 1 further including inhibit means connected to said second control means for inhibiting operation of said first control means.

8. A system for selecting one or more reservable seats or spaces at an event comprising, in combination: a plurality of remote stations containing signal forming means for forming a message signal containing criteria information at least partially identifying the desired space; an electronic digital computer means coupled to each of said remote stations and programmed to respond to message signals from each remote station to select and identify the best available unreserved spaces defined by the information in said message signal and to reserve such space to prevent the selected space from being selected in response to subsequent message signals; display means at each remote station coupled to said computer means for displaying an alpha-numeric representation of information pertaining to the identity of the spaces selected in response to a message signal from the respective remote station; and ticket printer means coupled to each of said display means for printing tickets relating to each displayed selected space, said printer means including holder means for holding print stock, print means including a plurality of character printers, control means responsive to the information pertaining to the identity of the selected spaces for positioning selected ones of said character printers in accordance with the information pertaining to the identity of the selected spaces, means for applying said print means to said print stock to cause the selected character printers to print characters on said stock, and shear means for shearing the printed stock.

References Cited

UNITED STATES PATENTS

| 2,883,106 | 4/1959 | Cornwell et al. | 340—172.5 X.R. |
| 3,071,753 | 1/1963 | Fritze et al. | 340—153 |
| 3,124,674 | 3/1964 | Edwards et al. | 340—172.5 X.R. |
| 3,252,149 | 5/1966 | Weida et al. | 340—172.5 |
| 3,308,439 | 3/1967 | Tink et al. | 340—172.5 |
| 3,323,119 | 5/1967 | Barcomb et al. | 340—172.5 X |
| 3,344,401 | 9/1967 | MacDonald et al. | 340—172.5 |
| 3,407,387 | 10/1968 | Looschen et al. | 340—152 |

PAUL J. HENON, Primary Examiner

H. E. SPRINGBORN, Assistant Examiner

U.S. Cl. X.R.

340—153

PO-1050
(5/69)

UNITED STATES PATENT OFFICE
CERTIFICATE OF CORRECTION

Patent No. 3,533,084   Dated October 6, 1970.

Inventor(s) Robert D. Cook, Walter T. McHale

It is certified that error appears in the above-identified patent and that said Letters Patent are hereby corrected as shown below:

Column 1, line 23, should read "representation of the information signals and of the reply message are displayed at the remote station."; Column 1, line 60, "It has been the experience of many" should read --Many--; Column 1, line 61, strike "to"; Column 2, line 7, "retieval" should read --retrieval--; Column 2, line 65, "form" should read --embodiment--; Column 3, line 66, "commuications" should read --communications--; Column 4, line 16, strike "upon its operation"; Column 10, line 6, "6" should read --"6"--; Column 11, line 36, the tenth character of the code should read --d-- instead of "b"; Column 11, line 45, "or" should read --and--; Column 12, line 1, "message" should read --message,--; Column 12, line 64, "In operating" should read --In the operation-- Column 13, line 1, "transaction" should read --transactions--; Column 13, line 5, "transaction" should read --transactions--; Column 15, line 59, should read "the ticket stock forward (to the left as shown in the draw-"; Column 16, line 4, "26 to half" should read --226 to half--; Column 17, line 31, "12" should read --212--; Column 17, line 63, after "information" should read --storage--; Column 18, line 11, after "information" should read --storage--;

SIGNED AND
SEALED
JAN 5 1971

(SEAL)
Attest:

Edward M. Fletcher, Jr.
Attesting Officer

WILLIAM E. SCHUYLER, JR.
Commissioner of Patents

PO-1050
(5/69)

UNITED STATES PATENT
CERTIFICATE OF CORRECTION

Patent No. 3,533,084      Dated October 6, 1970.

Inventor(s) Robert D. Cook, Walter T. McHale

It is certified that error appears in the above-identified patent and that said Letters Patent are hereby corrected as shown below:

Column 1, line 23, should read "representation of the information signals and of the reply message are displayed at the remote station."; Column 1, line 60, "It has been the experience of many" should read --Many--; Column 1, line 61, strike "to"; Column 2, line 7, "retieval" should read --retrieval--; Column 2, line 65, "form" should read --embodiment--; Column 3, line 66, "conmuications" should read --communications--; Column 4, line 16, strike "upon its operation"; Column 10, line 6, "6" should read --"6"--; Column 11, line 36, the tenth character of the code should read --d-- instead of "b"; Column 11, line 45, "or" should read --and--; Column 12, line 1, "message" should read --message,--; Column 12, line 64, "In operating" should read --In the operation--; Column 13, line 1, "transaction" should read --transactions--; Column 13, line 5, "transaction" should read --transactions--; Column 15, line 59, should read "the ticket stock forward (to the left as shown in the draw-"; Column 16, line 4, "26 to half" should read --226 to halt--; Column 17, line 31, "12" should read --212--; Column 17, line 63, after "information" should read --storage--; Column 18, line 11, after "information" should read --storage--;

This certificate supersedes Certificate of Correction issued January 5, 1971.

Signed and sealed this 23rd day of February 1971.

SEAL)
ttest:

DWARD M. FLETCHER, JR.                WILLIEM E. SCHUYLER, JR.
ttesting Officer                          Commissioner of Patents